United States Patent
Dettinger et al.

(10) Patent No.: US 7,765,226 B2
(45) Date of Patent: Jul. 27, 2010

(54) METHOD OF GENERATING DATABASE TRANSACTION STATEMENTS BASED ON EXISTING QUERIES

(75) Inventors: Richard D. Dettinger, Rochester, MN (US); Richard J. Stevens, Mantorville, MN (US)

(73) Assignee: International Business Machines Corporation, Armonk, NY (US)

( * ) Notice: Subject to any disclaimer, the term of this patent is extended or adjusted under 35 U.S.C. 154(b) by 1637 days.

(21) Appl. No.: 10/753,520

(22) Filed: Jan. 8, 2004

(65) Prior Publication Data

US 2005/0154756 A1    Jul. 14, 2005

(51) Int. Cl.
*G06F 17/30* (2006.01)
(52) U.S. Cl. ..................... 707/768; 707/769
(58) Field of Classification Search ................ 709/219
See application file for complete search history.

(56) References Cited

U.S. PATENT DOCUMENTS

| | | | |
|---|---|---|---|
| 5,734,887 A * | 3/1998 | Kingberg et al. | 707/4 |
| 6,088,698 A * | 7/2000 | Lipkin | 707/10 |
| 6,601,059 B1 * | 7/2003 | Fries | 707/3 |
| 6,725,227 B1 | 4/2004 | Li | |
| 6,801,903 B2 * | 10/2004 | Brown et al. | 707/2 |
| 6,892,196 B1 * | 5/2005 | Hughes | 707/4 |
| 7,051,041 B1 * | 5/2006 | Miller | 707/102 |
| 2003/0037069 A1 * | 2/2003 | Davison | 707/200 |
| 2003/0101238 A1 * | 5/2003 | Davison | 709/219 |

\* cited by examiner

*Primary Examiner*—Khanh B Pham
(74) *Attorney, Agent, or Firm*—Patterson & Sheridan, LLP

(57) ABSTRACT

The present invention is generally directed providing a method, system and article of manufacture for automatically generating database transaction statements (such as queries, inserts, updates, and deletes) based on fields from existing queries and user input. By identifying fields of existing queries (or statements) and gathering attributes of those fields, a transaction generator can be configured to provide users with a selection of generated transactions that can be performed on data that corresponds to the selected fields. The selection of transactions may be provided to users via a variety of interfaces including graphic interfaces and plug-in components utilized by external applications.

21 Claims, 12 Drawing Sheets

FIG. 4F

DELETE RECORD

UPDATE VALUES BELOW:

KEY: 4

PRIMARY STAGE: SUCCESSFUL

SECONDARY STAGE: INITIATED

TERTIARY STAGE: PENDING

FOURTH STAGE: NULL

410$_F$ DELETE

411 CANCEL

FIG. 4G

DELETE RECORD

MULTIPLE SELECTION:

UPDATE VALUES BELOW:

| | KEY: | PRIMARY STAGE: | SECONDARY STAGE: | TERTIARY STAGE: | FOURTH STAGE: |
|---|---|---|---|---|---|
| ☑ 401_G | 10 | PENDING | PENDING | NULL | NULL |
| ☑ 401_G | 11 | PENDING | PENDING | NULL | NULL |
| ☑ 401_G | 12 | PENDING | PENDING | NULL | NULL |

410_G DELETE    411 CANCEL

METHOD OF GENERATING DATABASE TRANSACTION STATEMENTS BASED ON EXISTING QUERIES

BACKGROUND OF THE INVENTION

1. Field of the Invention

The present invention generally relates to data processing, and more particularly, to the generation of database transactions based on attributes of existing queries.

2. Description of the Related Art

Databases are computerized information storage and retrieval systems. A relational database management system is a computer database management system (DBMS) that uses relational techniques for storing and retrieving data. The most prevalent type of database is the relational database, a tabular database in which data is defined so that it can be reorganized and accessed in a number of different ways. A distributed database is one that can be dispersed or replicated among different points in a network. An object-oriented programming database is one that is congruent with the data defined in object classes and subclasses.

Regardless of the particular architecture, in a DBMS, a requesting entity (e.g., an application or the operating system) demands access to a specified database by issuing a database access request. Such requests may include, for instance, simple catalog lookup requests or transactions and combinations of transactions that operate to read, change and add specified records in the database. These requests are made using high-level query languages such as the Structured Query Language (SQL). Illustratively, SQL is used to make interactive queries for getting information from and updating a database such as International Business Machines' (IBM) DB2, Microsoft's SQL Server, and database products from Oracle, Sybase, and Computer Associates. The term "query" denominates a set of commands for retrieving data from a stored database. Queries take the form of a command language that lets programmers and programs select, insert, update, find out the location of data, and so forth.

One of the issues faced by data mining and database query applications, in general, is their close relationship with a given database schema (e.g., a relational database schema). This relationship makes it difficult to support an application as changes are made to the corresponding underlying database schema. Further, the migration of the application to alternative underlying data representations is inhibited. In today's environment, the foregoing disadvantages are largely due to the reliance applications have on SQL, which presumes that a relational model is used to represent information being queried. Furthermore, a given SQL query is dependent upon a particular relational schema since specific database tables, columns and relationships are referenced within the SQL query representation. As a result of these limitations, a number of difficulties arise.

One difficulty is that changes in the underlying relational data model require changes to the SQL foundation that the corresponding application is built upon. Therefore, an application designer must either forgo changing the underlying data model to avoid application maintenance or must change the application to reflect changes in the underlying relational model. Another difficulty is that extending an application to work with multiple relational data models requires separate versions of the application to reflect the unique SQL requirements driven by each unique relational schema. Yet another difficulty is evolution of the application to work with alternate data representations because SQL is designed for use with relational systems. Extending the application to support alternative data representations, such as XML, requires rewriting the application's data management layer to use non-SQL data access methods.

A typical approach used to address the foregoing problems is software encapsulation. Software encapsulation involves using a software interface or component to encapsulate access methods to a particular underlying data representation. An example is found in the Enterprise JavaBean (EJB) specification that is a component of the Java 2 Enterprise Edition (J2EE) suite of technologies. In accordance with the EJB specification, entity beans serve to encapsulate a given set of data, exposing a set of Application Program Interfaces (APIs) that can be used to access this information. This is a highly specialized approach requiring the software to be written (in the form of new entity EJBs) whenever a new set of data is to be accessed or when a new pattern of data access is desired. The EJB model also requires a code update, application built and deployment cycle to react to reorganization of the underlying physical data model or to support alternative data representations. EJB programming also requires specialized skills since more advanced Java programming techniques are involved. Accordingly, the EJB approach and other similar approaches are rather inflexible and costly to maintain for general-purpose query applications accessing an evolving physical data model.

Another shortcoming of the prior art is that creating and managing database transaction statements (including queries, inserts, updates, and deletes) can be a very inefficient and complex process. A large variety of transactions can be submitted to the database. However, not all these transactions may be appropriate. Database administrators must work closely with data stewards and end users to ensure that each transaction acts on the data within the database in an appropriate manner. Generally, a significant amount of communication between the database administrator and the end users is required—this reduces database availability while raising the database operating cost.

Therefore, what is needed is a system that significantly simplifies data management tasks of administrators and users. The system should assist administrators in enabling users and managing user transactions. Users, on the other hand, should be able to modify data within the database without needing technical knowledge of databases and of database schemas within a specific instance.

SUMMARY OF THE INVENTION

The present invention provides a method, system and article of manufacture for generating database transaction statements based on existing database statements.

For some embodiments, a method for generating a transactional database statement based on an existing database statement generally includes parsing the existing database statement to identify fields and corresponding field attributes, utilizing one or more interfaces for receiving input regarding the transactional statement, and generating the transactional database statement based on the identified fields and user input.

Another embodiment provides a computer-readable medium containing a program for generating a transactional database statement based on an existing database statement. When executed by a processor, the program performs operations generally including parsing the existing database statement to identify fields and corresponding field attributes, generating one or more interfaces for receiving input regarding the transactional statement, and generating the transactional database statement based on the identified fields and user input.

Yet another embodiment provides a data processing system that generally includes a database, an existing query statement, a query interface allowing users to issue query statements against the database, and a transaction manager configured to generate a transactional statement against the database based on fields and corresponding field attributes of the existing query statement.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

FIGS. 4A-4G illustrate exemplary graphical user interface (GUI) screens in accordance with one embodiment of the present invention.

DETAILED DESCRIPTION OF THE PREFERRED EMBODIMENTS

Figure 1:
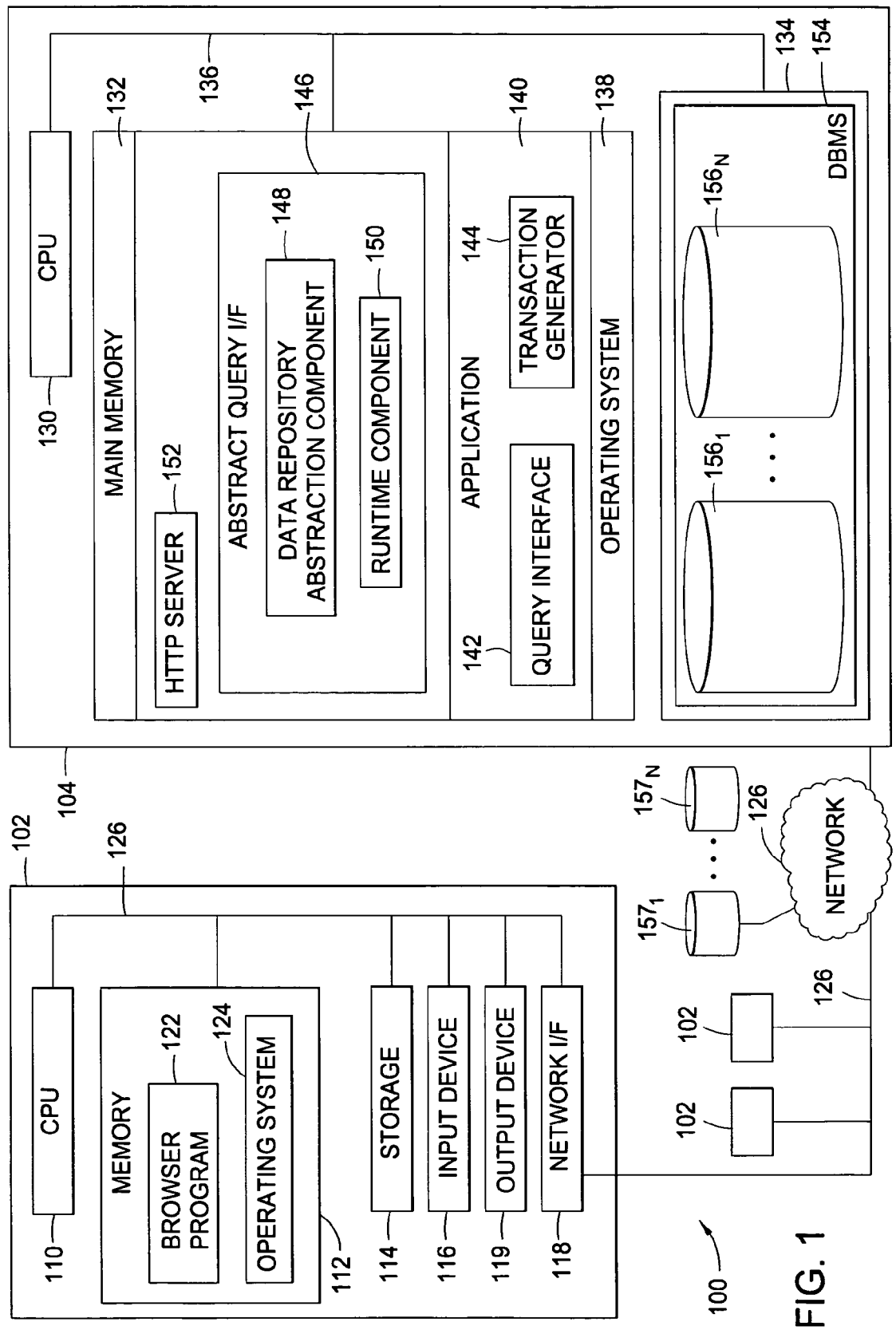
FIG. 1 is a computer system illustratively utilized in accordance with the present invention.

The present invention provides a method, system and article of manufacture for automatically generating database transaction statements (such as queries, inserts, updates, and deletes) based on user input and fields from existing queries. By identifying fields of existing queries (or statements) and gathering attributes of those fields, a transaction generator can be configured to provide users with a selection of generated transactions that can be performed on data that corresponds to the selected fields. The selection of transactions may be provided to users via a variety of interfaces including graphic interfaces and plug-in components utilized by external applications.

As used herein, the term database generally refers to a collection of data arranged for ease and speed of search and retrieval. Further, a database comprises logical and physical structures. While the following description focuses on generating transaction statements for relational databases, those skilled in the art will recognize the methods described herein may be used with any type of database including an object-relational database and an XML-based database.

As used herein, the term field may correspond to a column within a table of a relational database. Those skilled in the art will recognize that the term field may also represent a component of logical records located within data structures of a variety of databases including object relational databases and XML-based databases.

As used herein, the term query generally refers to statements designed to retrieve data from the database. For example, the query may be a "select" statement written using SQL. However the term query may also be used to generally describe any database transaction statement, including an insert, update or delete statement.

As used herein, the term metadata refers to descriptive information including but not limited to: the attributes of a processing environment, an application, users of the application and other managed data in the system. Metadata based on managed data includes descriptive information about the context and characteristics of data managed within the system. Security oriented user information, such as user credentials, and user invoked session information also constitutes metadata.

As used herein, the term user may generally apply to any entity utilizing the database processing system described herein, such as a person (e.g., an individual) interacting with an application program or an application program itself, for example, performing automated tasks. While the following description may often refer to a graphical user interface (GUI) intended to present information to and receive information from a person, it should be understood that in many cases, the same functionality may be provided through a non-graphical user interface, such as a command line and, further, similar information may be exchanged with a non-person user via a programming interface.

In one embodiment, a particular data definition framework (referred to herein as a data repository abstraction (DRA) layer/component) is provided for accessing and modifying (inserting, updating or deleting) data independent of the particular manner in which the data is physically represented. The data may be located in a single repository (i.e., source) of data or a plurality of different data repositories. Thus, the data definition framework may provide a logical view of one or more underlying data repositories.

One embodiment of the invention is implemented as a program product for use with a computer system and described below. The program(s) of the program product defines functions of the embodiments (including the methods described herein) and can be contained on a variety of signal-bearing media. Illustrative signal-bearing media include, but are not limited to: (i) information permanently stored on non-writable storage media (e.g., read-only memory devices within a computer such as CD-ROM disks readable by a CD-ROM drive); (ii) alterable information stored on writable storage media (e.g., floppy disks within a diskette drive or hard-disk drive); or (iii) information conveyed to a computer by a communications medium, such as through a computer or telephone network. The latter embodiment specifically includes information downloaded from the Internet and other networks. Such signal-bearing media, when carrying computer-readable instructions that direct the functions of the present invention, represent embodiments of the present invention.

In general, the routines executed to implement the embodiments of the invention, may be part of an operating system or a specific application, component, program, module, object, or sequence of instructions. The software of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular nomenclature that follows is used merely for convenience, and thus the invention should not be limited to use solely in any specific application identified and/or implied by such nomenclature.

Exemplary Application Environment

FIG. 1 depicts a block diagram of a networked system 100 in which embodiments of the present invention may be implemented. In general, the networked system 100 includes a client (i.e., generally any requesting entity such as a user or application) computer 102 (three such client computers 102 are shown) and at least one server computer 104. The client computer 102 and the server computer 104 are connected via a network 126. In general, the network 126 may be a local area network (LAN) and/or a wide area network (WAN). In a particular embodiment, the network 126 is the Internet. However, it is noted that aspects of the invention need not be implemented in a distributed environment. As such, the client computers 102 and the server computer 104 are more generally representative of any requesting entity (such as a user or application) issuing queries and a receiving entity configured to handle the queries, respectively.

The client computer 102 includes a Central Processing Unit (CPU) 110 connected via a bus 130 to a memory 112, storage 114, an input device 116, an output device 119, and a network interface device 118. The input device 116 can be any device to give input to the client computer 102. For example, a keyboard, keypad, light-pen, touch-screen, track-ball, or speech recognition unit, audio/video player, and the like could be used. The output device 119 can be any device to give output to the user, e.g., any conventional display screen. Although shown separately from the input device 116, the output device 119 and input device 116 could be combined. For example, a display screen with an integrated touch-screen, a display with an integrated keyboard, or a speech recognition unit combined with a text speech converter could be used.

The network interface device 118 may be any entry/exit device configured to allow network communications between the client computer 102 and the server computer 104 via the network 126. For example, the network interface device 118 may be a network adapter or other network interface card (NIC).

Storage 114 is preferably a Direct Access Storage Device (DASD). Although it is shown as a single unit, it could be a combination of fixed and/or removable storage devices, such as fixed disc drives, floppy disc drives, tape drives, removable memory cards, or optical storage. The memory 112 and storage 114 could be part of one virtual address space spanning multiple primary and secondary storage devices.

The memory 112 is preferably a random access memory sufficiently large to hold the necessary programming and data structures of the invention. While the memory 112 is shown as a single entity, it should be understood that the memory 112 may in fact comprise a plurality of modules, and that the memory 112 may exist at multiple levels, from high speed registers and caches to lower speed but larger DRAM chips.

Illustratively, the memory 112 contains an operating system 124. Illustrative operating systems, which may be used to advantage, include Linux and Microsoft's Windows®. More generally, any operating system supporting the functions disclosed herein may be used.

The memory 112 is also shown containing a browser program 122 that, when executed on CPU 110, provides support for navigating between the various servers 104 and locating network addresses at one or more of the servers 104. In one embodiment, the browser program 122 includes a web-based Graphical User Interface (GUI), which allows the user to display Hyper Text Markup Language (HTML) information. More generally, however, the browser program 122 may be any GUI-based program capable of rendering the information transmitted from the server computer 104.

The server computer 104 may be physically arranged in a manner similar to the client computer 102. Accordingly, the server computer 104 is shown generally comprising a CPU 130, a memory 132, and a storage device 134, coupled to one another by a bus 136. Memory 132 may be a random access memory sufficiently large to hold the necessary programming and data structures that are located on the server computer 104.

The server computer 104 is generally under the control of an operating system 138 shown residing in memory 132. Examples of the operating system 138 include IBM OS/400®, UNIX, Microsoft Windows®, and the like. More generally, any operating system capable of supporting the functions described herein may be used.

The memory 132 further includes one or more applications 140 and an abstract query interface 146. The applications 140 and the abstract query interface 146 are software products comprising a plurality of instructions that are resident at various times in various memory and storage devices in the computer system 100. When read and executed by one or more processors 130 in the server 104, the applications 140 and the abstract query interface 146 cause the computer system 100 to perform the steps necessary to execute steps or elements embodying the various aspects of the invention. The applications 140 (and more generally, any requesting entity, including the operating system 138 and, at the highest level, users) issue queries against a database.

Illustrative sources against which queries may be issued include local databases $156_1 \ldots 156_N$, and remote databases $157_1 \ldots 157_N$, collectively referred to as database(s) 156-157). Illustratively, the databases 156 are shown as part of a database management system (DBMS) 154 in storage 134. More generally, as used herein, the term "databases" refers to any collection of data regardless of the particular physical representation. By way of illustration, the databases 156-157 may be organized according to a relational schema (accessible by SQL queries) or according to an XML schema (accessible by XML queries). However, the invention is not limited to a particular schema and contemplates extension to schemas presently unknown. As used herein, the term "schema" generically refers to a particular arrangement of data which is described by a data definition framework, such as an abstract data model described herein.

In some cases, queries issued by the applications 140 may be predefined (i.e., hard coded as part of the applications 140) or may be generated in response to input (e.g., user input) received via a query interface 142. The query interface 142 may provide one or more interfaces to a user (e.g., a human user or other application) allowing the specification of parameters to be used in generating a query. For some embodiments, the interfaces may include a graphical user interface (GUI). The content of the GUIs is generated by the application(s) 140. In a particular embodiment, the GUI content is hypertext markup language (HTML) content which may be rendered on the client computer systems 102 with the browser program 122. Accordingly, the memory 132 includes a Hypertext Transfer Protocol (http) server process 138 (e.g., a web server) adapted to service requests from the client computer 102. For example, the process 138 may respond to requests to access a database(s) 156, which illustratively resides on the server 104. Incoming client requests for data from a database 156-157 invoke an application 140.

When executed by the processor 130, the application 140 causes the server computer 104 to perform the steps or elements embodying the various aspects of the invention, including accessing the database(s) 156-157. In one embodiment, the application 140 comprises a plurality of servlets configured to build GUI elements, which are then rendered by the browser program 122. Where the remote databases 157 are accessed via the application 140, the data repository abstraction component 148 is configured with a location specification identifying the database containing the data to be retrieved. This latter embodiment will be described in more detail below.

FIG. 1 is merely one hardware/software configuration for the networked client computer 102 and server computer 104. Embodiments of the present invention can apply to any comparable hardware configuration, regardless of whether the computer systems are complicated, multi-user computing apparatus, single-user workstations, or network appliances that do not have non-volatile storage of their own. Further, it is understood that while reference is made to particular markup languages, including HTML, the invention is not limited to a particular language, standard or version. Accordingly, persons skilled in the art will recognize that the invention is adaptable to other markup languages as well as non-markup languages and that the invention is also adaptable to future changes in a particular markup language as well as to other languages presently unknown. Likewise, the http server process 138 shown in FIG. 1 is merely illustrative and other embodiments adapted to support any known and unknown protocols are contemplated.

In any case, as illustrated, the application 140 may have an associated transaction manager 144 generally configured to automatically generate database transaction statements (such as queries, inserts, updates, and deletes) based on user input and fields from existing queries. For example, by identifying fields of existing queries (or statements) and gathering attributes of those fields, the transaction generator 144 may be configured to provide users with a selection of generated transactions that can be performed on data that corresponds to the selected fields. As will be described in greater detail below, the selection of transactions (automatically generated or to be generated) by the transaction manager 144 may be provided to users via a variety of interfaces including GUIs and plug-in components utilized by external applications.

An Exemplary Runtime Environment

Figure 2A:
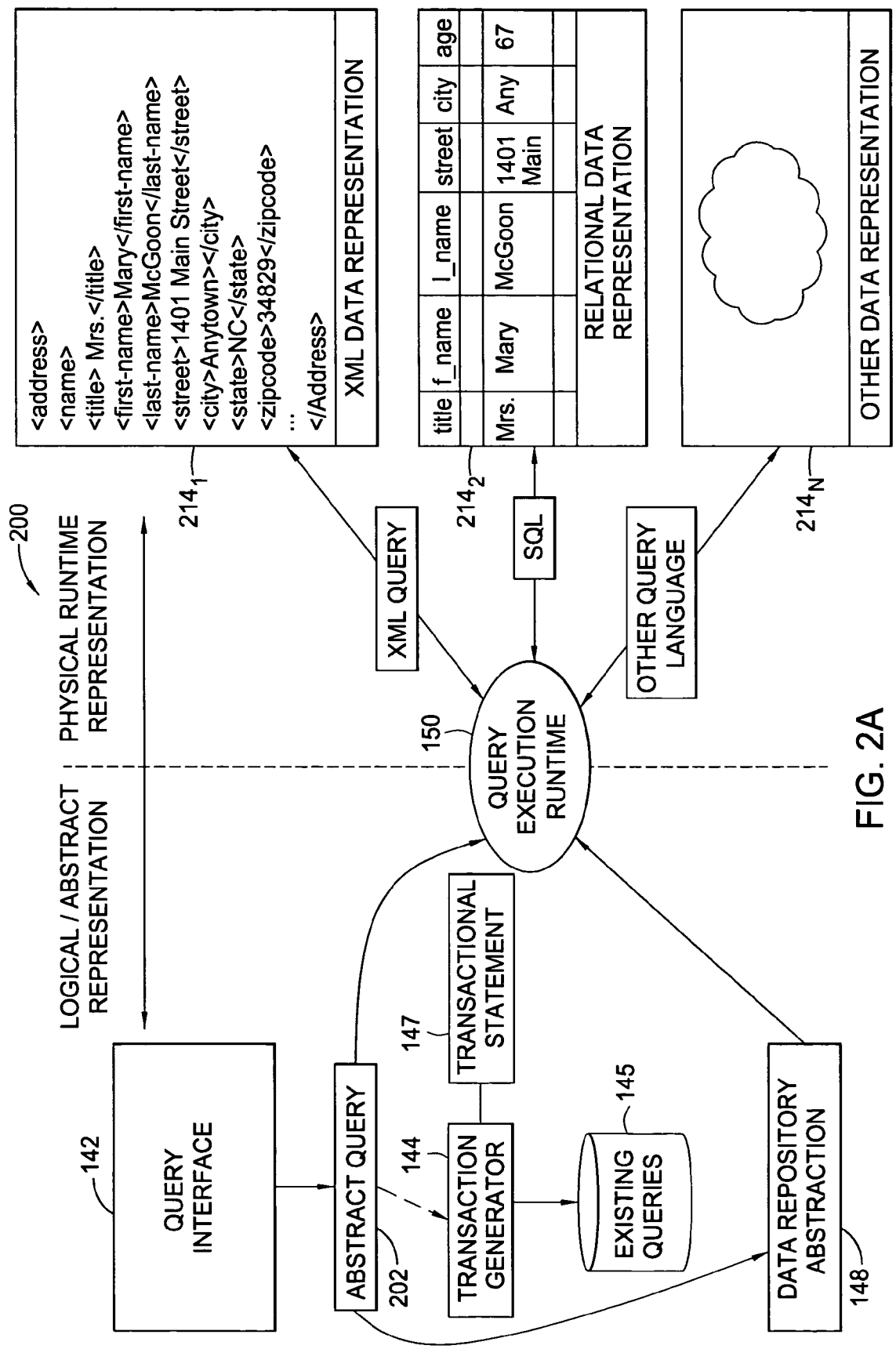
FIG. 2A is a relational view of software components of one embodiment of the invention.

FIG. 2A illustrates a relational view of the query interface 142 and the transaction generator 144 used to generate transactional statements 147 based on existing queries. As illustrated, the existing queries may include queries being generated by the query interface 142 or previously generated and saved queries 145. Further, the existing queries may be queries designed to return data (e.g., with SELECT statements) or, in some cases, transactional statements themselves.

As illustrated, for some embodiments, the queries (referred to herein as "abstract queries") may be composed using logical fields defined by the abstract query interface 146. In particular, the logical fields used in the abstract queries are defined by a data repository abstraction component 148. The abstract queries are executed by a runtime component 150 which transforms the abstract queries into a form (referred to herein as a concrete query) consistent with the physical representation (e.g., XML, SQL, or other type representation) of the data contained in one or more of the databases 156-157. The queries may be configured to access the data and return results, or to modify (i.e., insert, delete or update) the data.

Abstract queries may be executed by the query execution component 150. In the exemplary abstract data model, the logical fields are defined independently of the underlying data representation being used in the DBMS 154, thereby allowing queries to be formed that are loosely coupled to the underlying data representation 214. The query execution component 150 is generally configured to transform abstract queries into concrete queries compatible with the physical data representation (e.g., an XML representation $214_1$, an SQL representation $214_2$, or any other type of representation $214_3$), by mapping the logical fields of the abstract queries to the corresponding physical fields of the physical data representation 214. The mapping of abstract queries to concrete queries, by the query execution component 150, is described in detail in the commonly owned, co-pending U.S. patent application Ser. No. 10/083,075, entitled "Application Portability And Extensibility Through Database Schema And Query Abstraction," filed Feb. 26, 2002.

Generating Transactional Query Statements

Figure 2B:
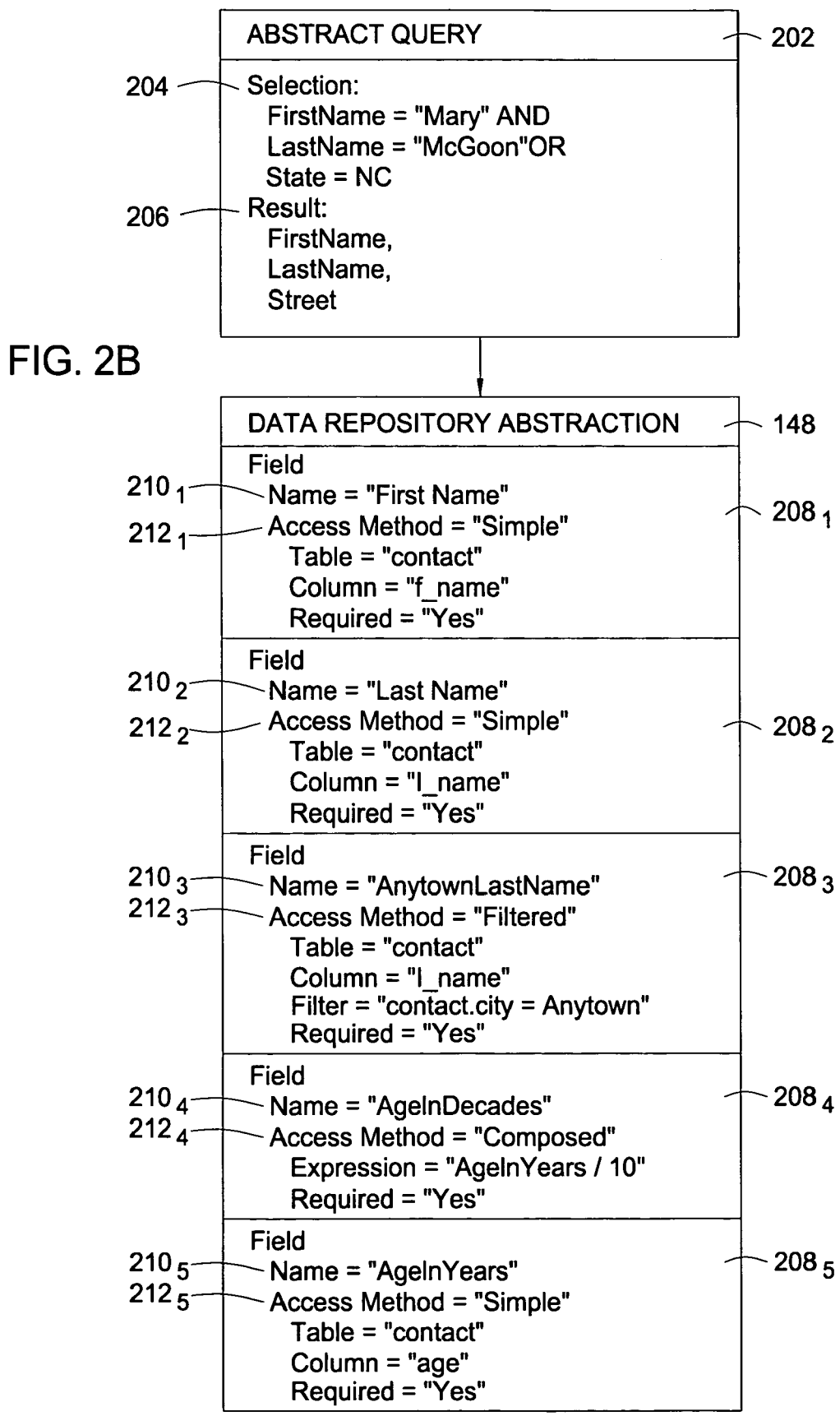
FIG. 2B is a chart illustrating fields of Data Repository Abstraction components and their attributes.
Figure 3A:
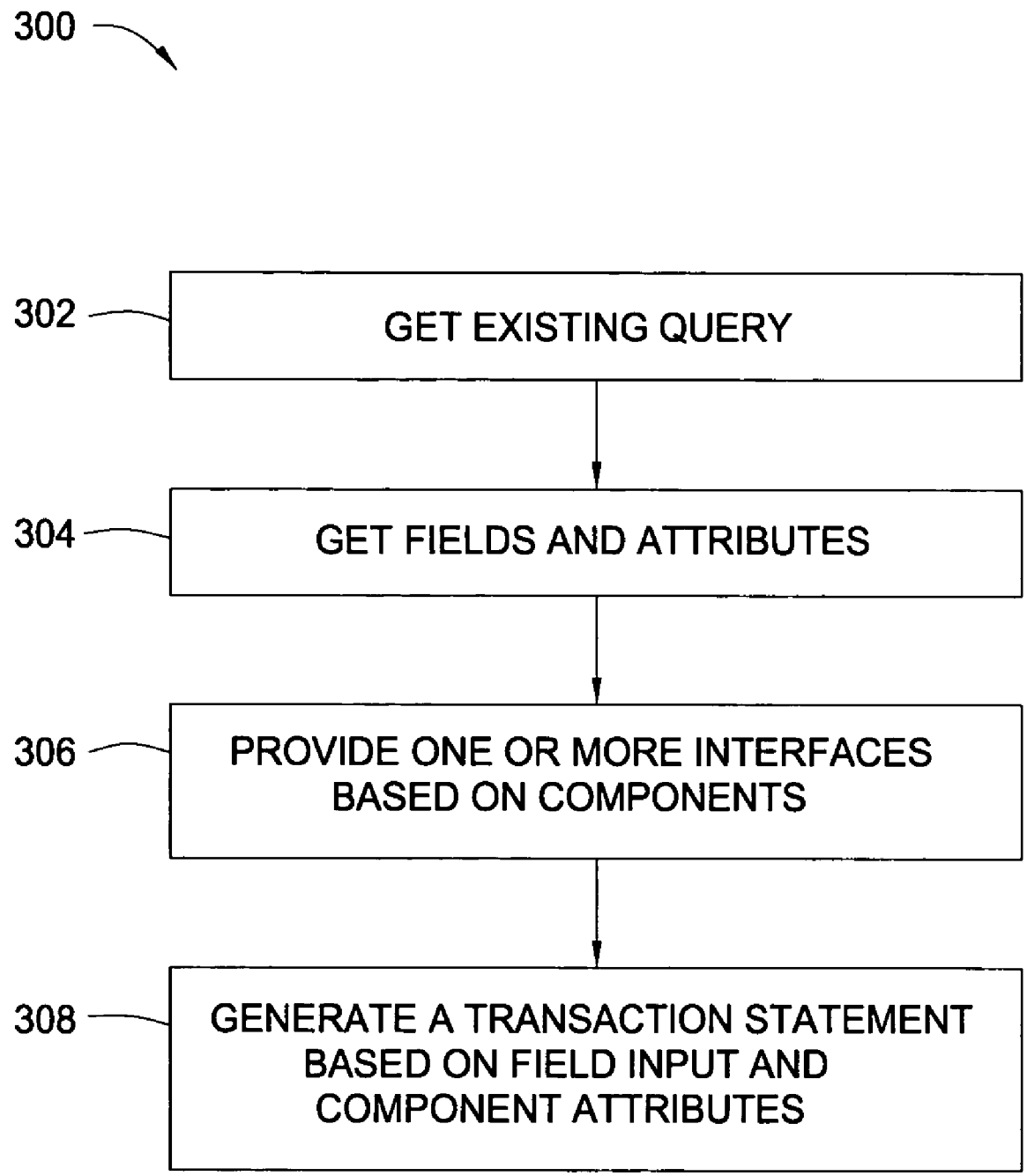
FIG. 3A is a flow chart illustrating exemplary operations for generating database transactions according to aspects of the present invention.
Figure 3B:
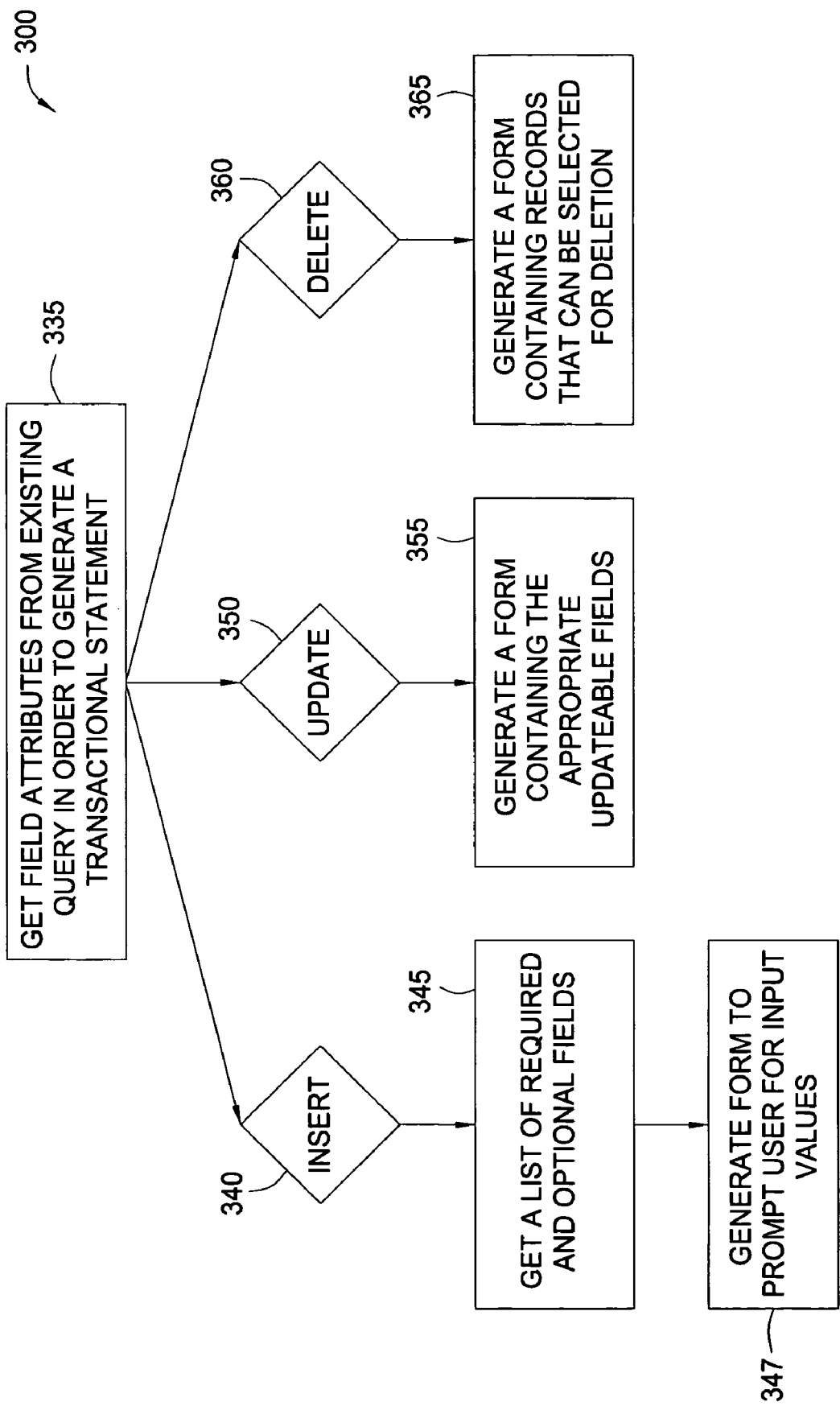
FIG. 3B is a flow chart illustrating exemplary operations for generating insert, update and delete based transaction statements.

FIGS. 3A and 3B are flow diagrams of exemplary operations 300 for the generation of database transaction statements based on user input and attributes of fields from existing queries. The operations 300 may be described with reference to FIGS. 2A and 2B and may be performed, for example, to offer users an opportunity to select and submit automatically generated transactions based on fields listed in existing queries.

FIG. 3A is a high-level flow diagram of exemplary operations 300 for the generation of a database transaction statement that begin at step 302, when an existing query is selected. As used herein, the term query generally refers to any database transaction statements including but not limited to selects, updates, inserts and deletes. An existing query 145 may be any executed or unexecuted statement residing in a repository, cache, or buffer that is accessible by the transaction generator 144.

After an existing query is selected, the query's fields and field attributes are gathered and analyzed at step 304. Fields may have associated attributes such as those shown in FIG. 2B. For example, if a field requires a non-null value, this attribute is among those considered by the transaction generator. Once all the fields are considered by the transaction generator, a metadata repository may be referenced to determine the types of transactions that may be performed with respect to the selected fields. For instance, insert, update, and delete statements may be suitable for some fields, while only updates and deletes may be appropriate for other fields.

At step 306, users are presented with one or more interfaces from which they can select transactions to be submitted to the database. The selection of transactions may be provided to users via a variety of interfaces including graphical interfaces and plug-in components utilized by external applications. Based on user input and field attributes, at step 308, transaction statements are assembled and prepared to be submitted to the database. FIGS. 4A-4G are GUI screens that illustrate one implementation of the steps listed above.

Figure 4A:
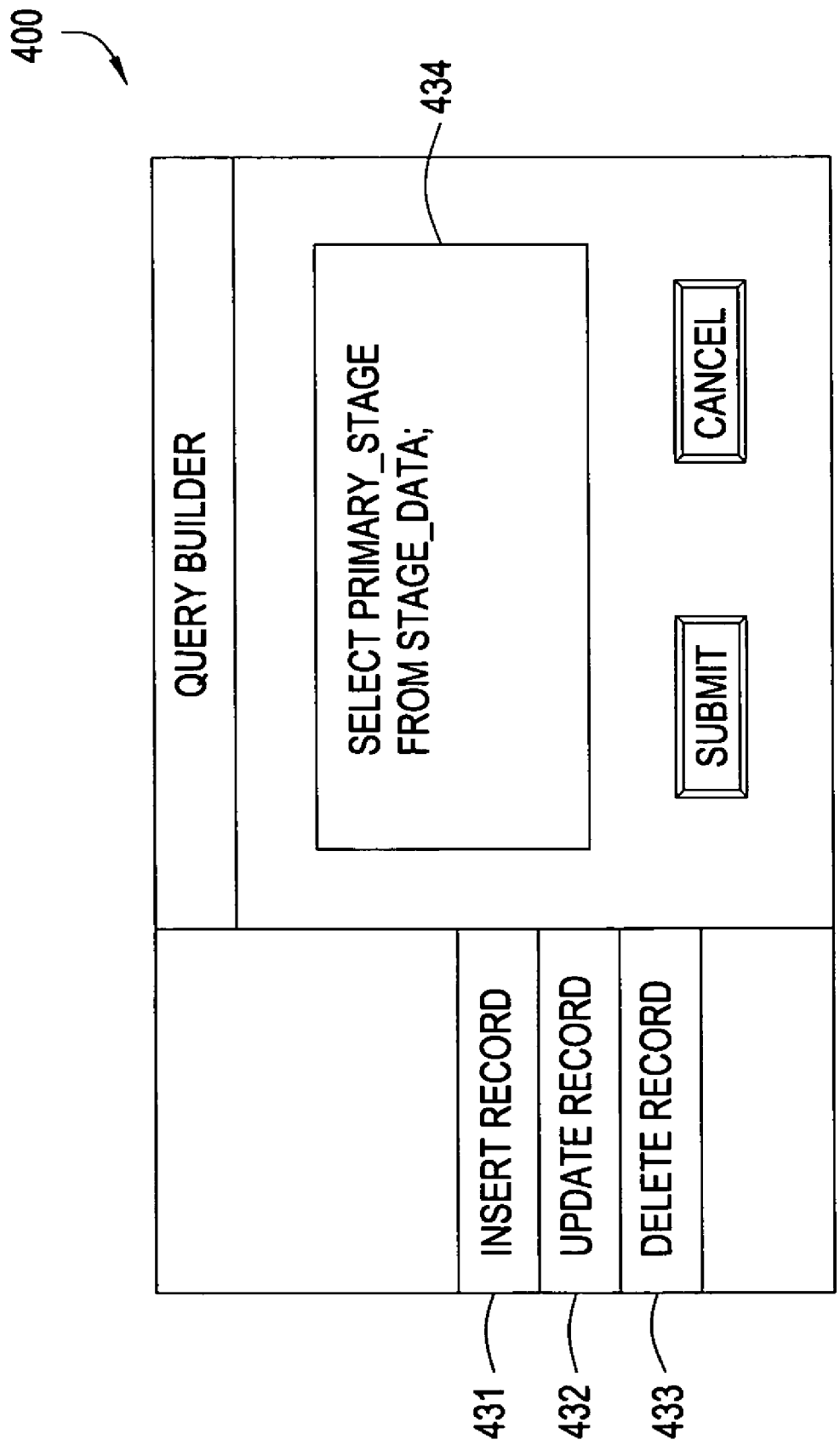

For example, FIG. 4A illustrates a screen from a query building application that includes plug-in components. Users are allowed to input query statements in a free-form text box 434 and then submit the transaction to the query execution runtime. In this embodiment of the invention, transaction based plug-in components (insert record 431, update record 432, and delete record 433) are presented as links on a standard GUI form. If any of these links are selected, the transaction generator will execute the appropriate process based on transaction type. FIGS. 4B-4G illustrate exemplary GUI forms that may be utilized when generating and issuing transactional statements.

FIG. 3B provides a more detailed flow diagram of exemplary operations 300 described above and focuses on the process flow corresponding to different types of transactions—illustratively, inserts, updates and deletes. At step 335, the transaction generator gathers and analyzes fields utilized in an existing query. Along with field attributes, the transaction generator also considers database privileges and security credentials of the user or calling program. For example, some users may only have insert privileges for a specific database; the transaction generator will not allow these users to select update or delete statements for submission to the database. The transaction generator may produce several types of transaction statements including inserts 340, updates 350, and deletes 360.

Insert Statements

For inserts, at step 345, a list containing all required and optional fields is compiled; this may be accomplished by referring to available metadata. Metadata may provide information such as which table the field belongs to and what the required fields for that table are. Next, a form, such as one shown in FIG. 4B, may be generated to allow users to input values for each of the fields. Some of the fields may be pre-populated with default values. Further, the form may include functionality to work in conjunction with the database management system so that users are prevented from entering invalid values for specific fields. For example, if insertion of a particular value would result in a primary key violation within the table containing the field, the form would relay the database error message to the user. More sophisticated forms may have built-in error handling functionality to programmatically handle data related errors.

Figure 4B:
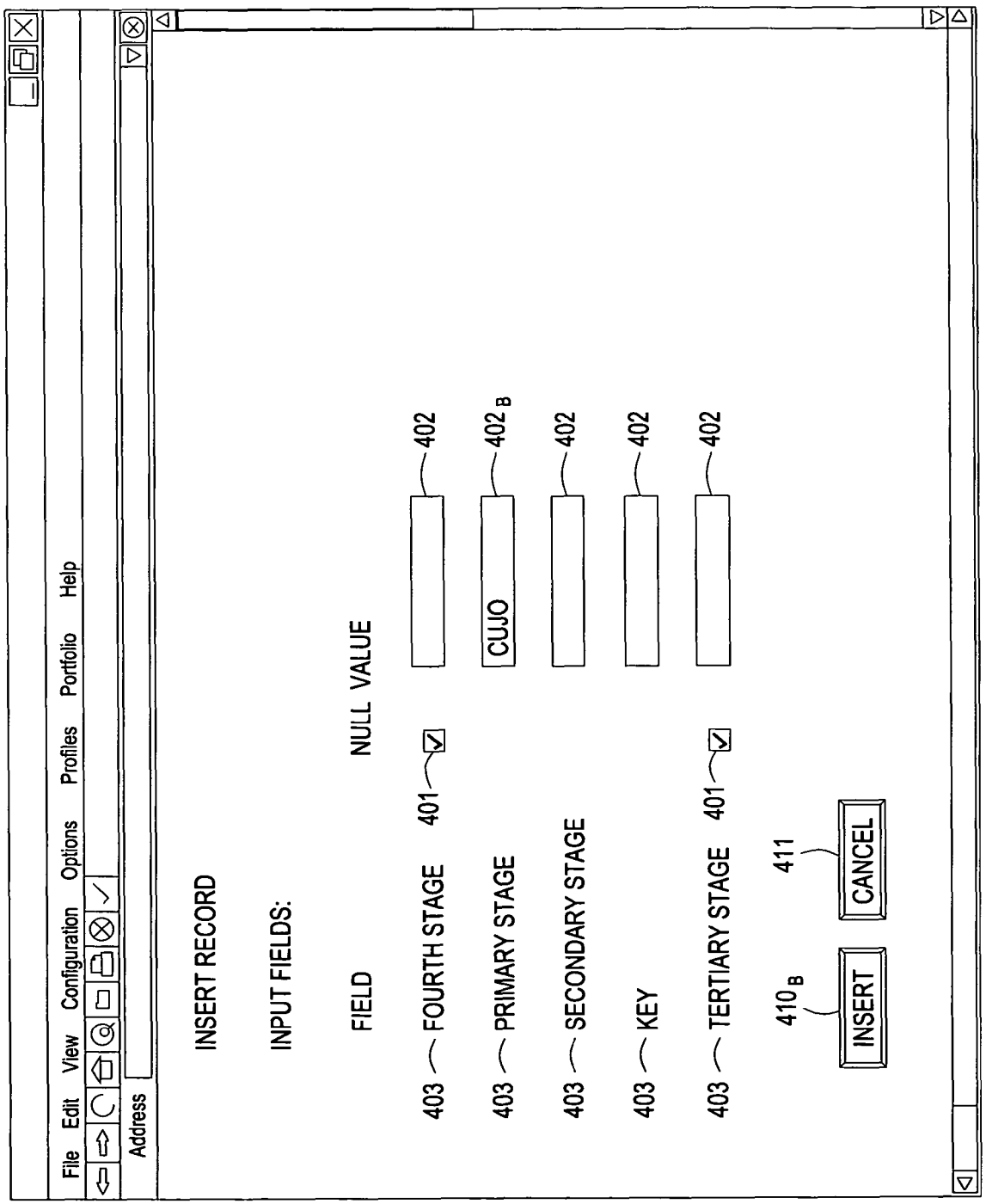

FIG. 4B illustrates an exemplary GUI screen that contains a form used for generating an insert statement. This screen is provided when the user clicks on the insert plug-in component 431 from the FIG. 4A. Suppose the user selects a field from the base query for which they would like to add a new value. The field chosen from the base query corresponds to a column in a relational table. In order to add a new value for the column, a new record, including values for all required columns, needs to be added to the table. The fields 402 shown represent all the columns of the table in which the new record will be inserted. Further, these fields 402 are presented as text boxes that allow users to input desired values. Some of the fields may be pre-populated with a default value as shown in field $402_B$. Yet other fields may permit null values and may have a check box 401 placed adjacent the field to allow users to set the field's value to "NULL".

If at any time the user decides to cancel the transaction, the cancel button 411 can be clicked to clear the text boxes, terminate the transaction and exit the screen without submitting any transactions. However, if the user wants to proceed with the transaction, the insert button 410B can be pushed; an insert statement incorporating the values entered in the fields 402 is assembled and submitted to the database. The transaction is not committed to the database, however. The user will get an opportunity to confirm their decision to perform this transaction in the next screen illustrated in FIG. 4C.

Figure 4C:
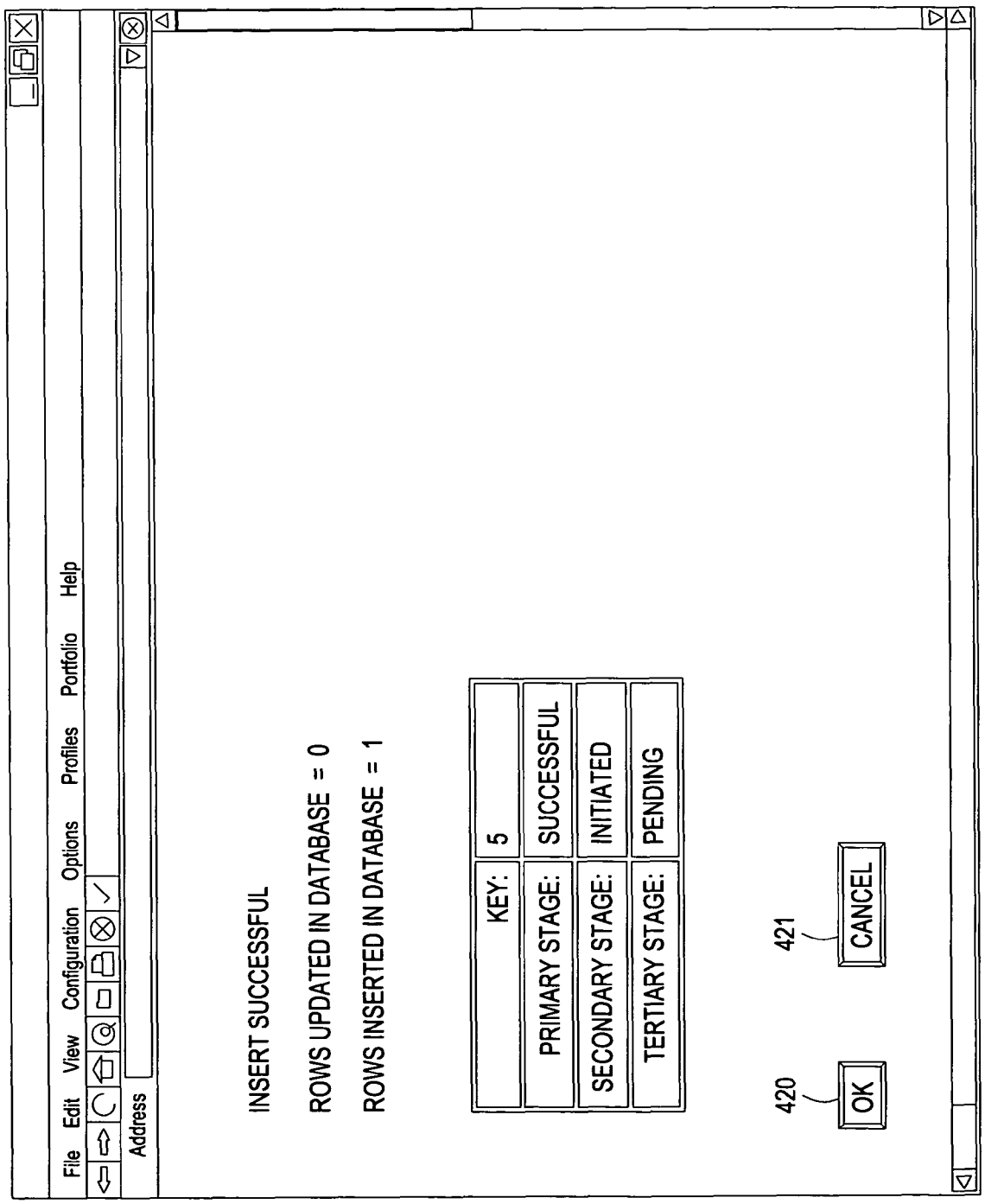

FIG. 4C illustrates a confirmation screen for the insert statement described above. This is a standard confirmation screen that may appear after a transaction has been submitted, but not yet committed to the database. While not illustrated in the figures, similar type confirmation screens may appear after each of the exemplary database data manipulation transactions (e.g., insert, update, and delete) discussed in this application.

In most relational database systems, data related changes made by one or more SQL statements constitute a transaction, and can be either committed or rolled back. After a transaction is committed or rolled back, the next transaction in line begins with its SQL statements. Committing a transaction makes permanent the changes resulting from all SQL statements in the transaction. The changes made by the SQL statements of a transaction become visible to other user's sessions only after the transaction is committed. Rolling back a transaction retracts any of the changes resulting from the SQL statements in the transaction. After a transaction is rolled back, the affected data is left unchanged, as if the SQL statements in the transaction were never run.

If the user wishes to undo the current transaction, they would push the cancel button 421 causing the transaction to be rolled back—meaning that the insert is not written permanently to the database. However, if the user decides to keep the transaction and write it permanently to the database, the ok button 420 is pushed. Pushing this button will perform a commit and permanently change data in the database.

Update Statements

Creation of an update statement proceeds by providing a form at step 355 (from FIG. 3B) that is used to generate the update statement. As with other types of transactions, user information and field attributes from the base query are gathered and analyzed. While the base query may contain only a subset of all the fields that comprise a record for a particular table, the update form displays all the table's fields. Not all the fields may be editable, however, because restrictions related to security and data integrity may not allow for the changing of values for certain fields.

Figure 4D:
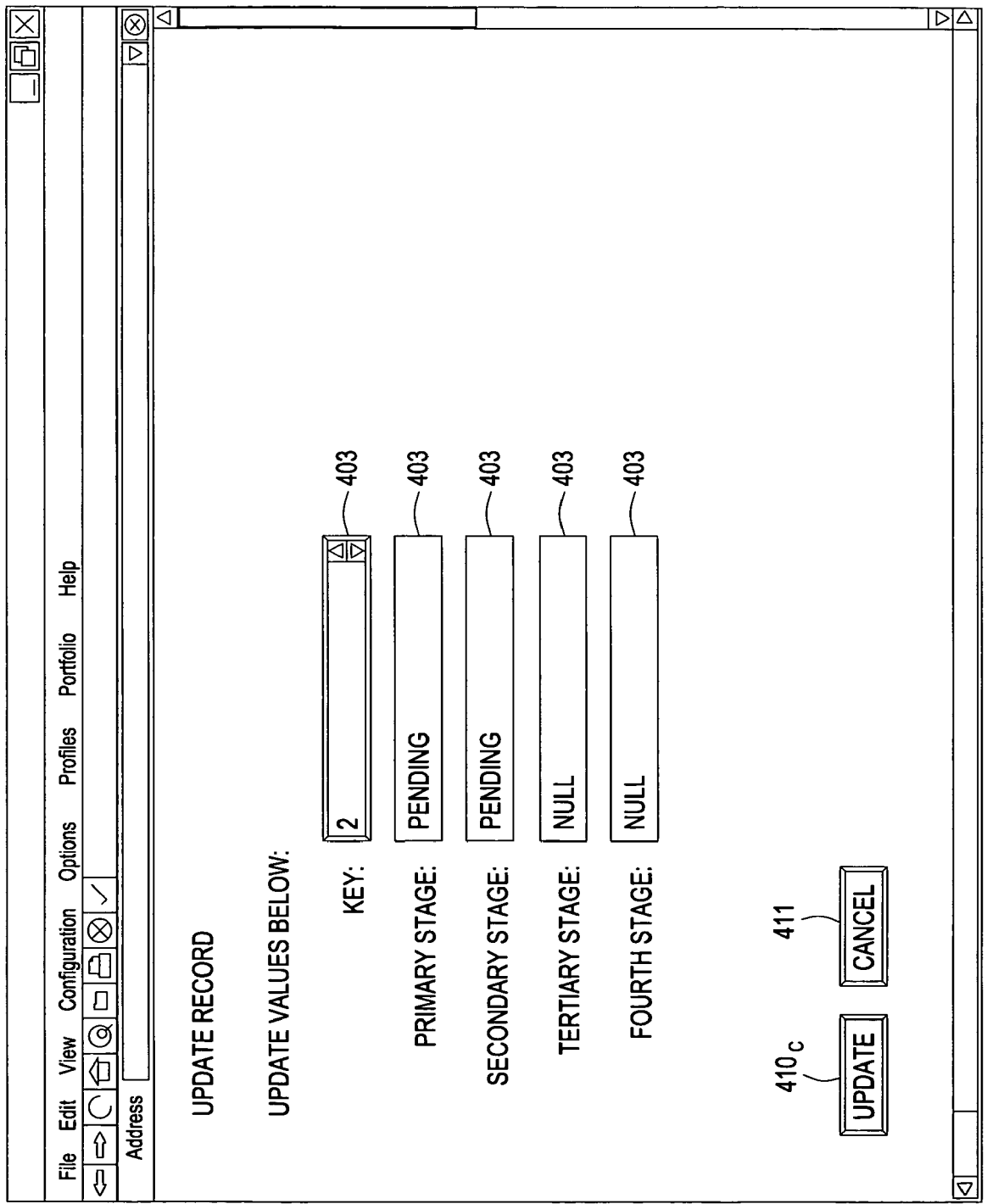

FIG. 4D illustrates an exemplary GUI screen containing a form designed to generate an update statement. Fields and their corresponding values from base queries are utilized to create this form. In this example, the base query contained the KEY field 403 with the value of "2"; the key field corresponds to a column in a table called "stages". If the user chooses to update a record based on its key value, a record in the stages table will need to be updated via the form shown in FIG. 4D.

All the columns in the stages table are represented by fields on the form. The key field 403 is a list box that allows users to scroll through key values. All other fields on this form are text boxes with values that correspond to the value stored in the column for a particular record. The user is able to see an entire record in the stages table. As different key values are selected, users are able to view the related records. Whether a field is updatable is determined by the field's attributes and related metadata. Once the user has selected the desired record and completed making changes to field values, the update button $410_C$ can be clicked to submit the transaction.

Some base queries may require parameters to be entered. For example, a base query might have the following structure:
SELECT col1, col2, col3 FROM table x, table y WHERE col1='Blue' and col2=?

In this case, the user may be prompted for a col2 value in order to complete the where clause portion of the query to identify a row to be updated. A separate form (GUI screen) may be provided to allow users to enter the desired value for the parameter. Once an acceptable value is entered (e.g., a valid col2 value), the base query is executed and the record(s) constituting the result set are retrieved and utilized. Similar forms may be utilized to specify a rows to be used in delete statements (described below).

Figure 4E:
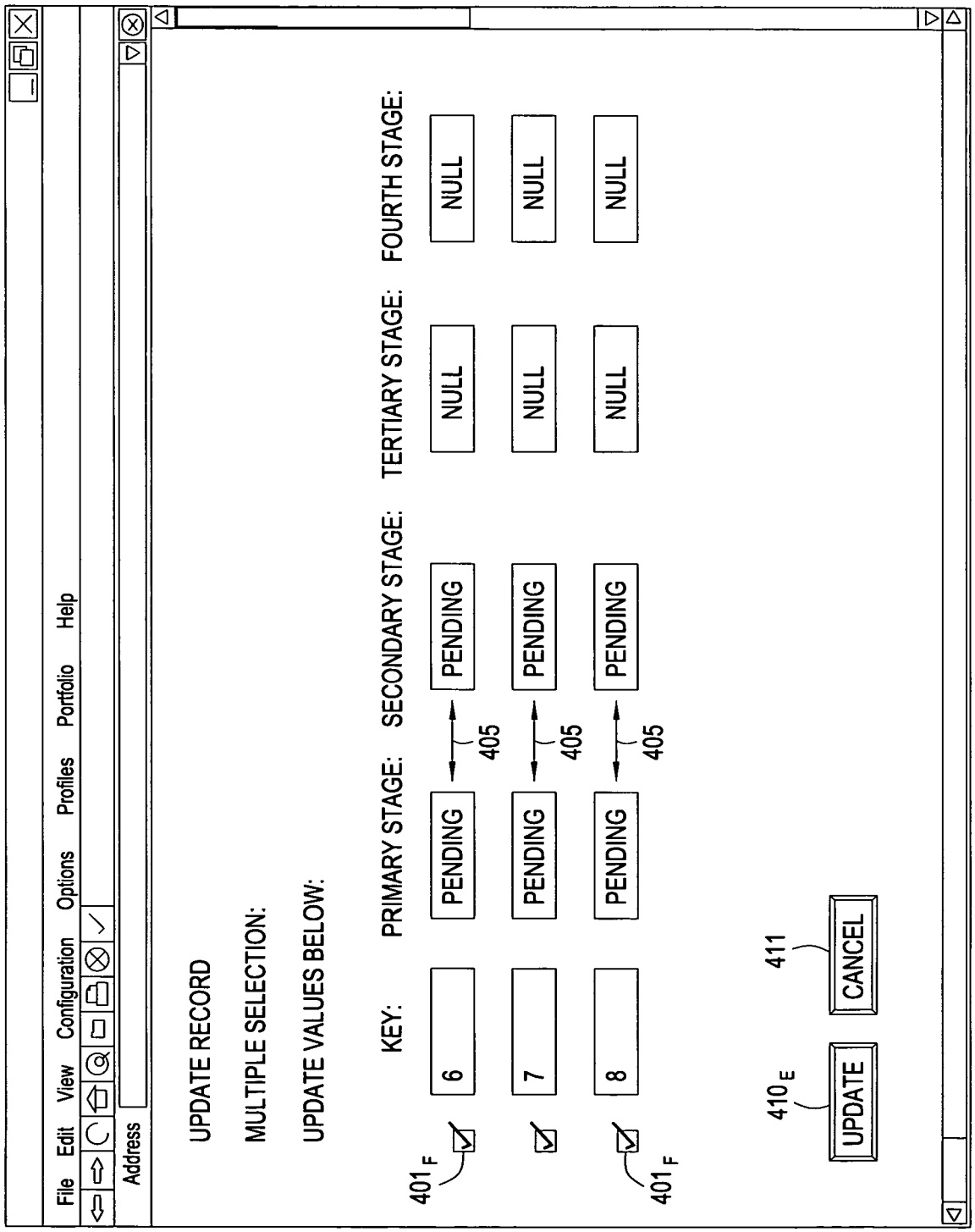

If the base query relates to multiple fields or values that are associated with multiple records, a form with multiple records, such as the one illustrated in FIG. 4E, may be generated. In some cases, the fields and values displayed in FIG. 4E may be obtained as results of a query using user-input parameters, as described above. Check boxes $401_F$ are provided so that users can indicate which records are to be updated. Even though multiple records are being modified, all of these changes are part of one transaction. In this case, 3 records are being updated. If, for example, data integrity related issues prevents one of the records from being updated, the entire transaction will be rolled back. In other words, none of the changes, even for records where there wasn't a problem, will go into effect.

Delete Statements

Delete statements are generated via a form at step 365 on FIG. 3B. As with the update process described above, all fields of a selected record are displayed. This allows users to review values for all the fields and confirm that the record selected is the correct record to be deleted.

FIGS. 4F and 4G illustrate forms that create statements for deleting single and multiple records, respectively. As with the update forms described above, all the columns of the corresponding table are represented by fields. The fields are not editable, however, they are simply provided to allow users to review the values and confirm that the correct record is selected for deletion.

As those skilled in the art will recognize, all three types of transactions described above are subject to restrictions related to database security and data integrity. For example, if a user does not have privileges to perform updates and deletes on certain tables, all attempts to submit update and delete transactions will result in a database management system error. Errors will also occur if a transaction violates existing constraints such as primary keys, foreign keys and check constraints.

The example forms described above present fields and records from a single table. However, those skilled in the art will recognize the methods described herein may be used with transactions affecting records from multiple tables which may be located in various databases in a distributed database environment.

While the foregoing is directed to embodiments of the present invention, other and further embodiments of the invention may be devised without departing from the basic scope thereof, and the scope thereof is determined by the claims that follow.

What is claimed is:

1. A computer-implemented method for generating a transactional database statement based on an existing database statement, comprising:
   parsing the existing database statement to identify fields and corresponding field attributes;
   utilizing one or more interfaces for receiving input regarding the transactional database statement; and
   generating the transactional database statement based on the identified fields and user input.

2. The method of claim 1, wherein the transactional database statement is one of: an insert statement, an update statement, and a delete statement.

3. The method of claim 2, wherein generating the transactional database statement based on the identified fields and user input comprises:
   generating a transactional database statement with one or more of the identified fields; and
   populating one or more of the fields with input received via the one or more interfaces.

4. The method of claim 1, further comprising attaining metadata regarding one or more of the identified fields.

5. The method of claim 1, wherein utilizing the one or more interfaces comprises:
   generating at least one graphical user interface for receiving input from a user, wherein the graphical user interface allows the user to specify one or more records to affect with the transactional database statement.

6. The method of claim 5, wherein utilizing the one or more interfaces further comprises:
   issuing a query to retrieve data related to at least one record specified by the user via the graphical user interface; and
   displaying the data retrieved in the graphical user interface.

7. The method of claim 6, wherein:
   the transactional database statement is an update statement;
   the graphical user interface allows the user to make changes to at least a portion of the retrieved data; and
   submit the changes to the database via the transactional database statement.

8. The method of claim 7, wherein:
   the graphical user interface allows the make changes data related to more than one record; and
   submit the changes to the database via the transactional database statement.

9. The method of claim 5, further comprising providing the user access to the graphical user interface screen via a plug-in component to an application.

10. A computer-readable storage medium containing a program for generating a transactional database statement based on an existing database statement which, when executed by a processor, performs operations comprising:
    parsing the existing database statement to identify fields and corresponding field attributes;
    generating one or more interfaces for receiving input regarding the transactional database statement; and
    generating the transactional database statement based on the identified fields and user input.

11. The computer-readable medium of claim 10, wherein the transactional database statement is one of: an insert statement, an update statement, and a delete statement.

12. The computer-readable medium of claim 10, wherein generating the transactional database statement based on the identified fields and user input comprises:
    generating a transactional database statement with one or more of the identified fields; and
    populating one or more of the fields with input received via the one or more interfaces.

13. The computer-readable medium of claim 10, wherein generating the one or more interfaces comprises:
    generating at least one graphical user interface for receiving input from a user, wherein the graphical user interface allows the user to specify one or more records to affect with the transactional database statement.

14. The computer-readable medium of claim 13, wherein generating the one or more interfaces further comprises:

issuing a query to retrieve data related to at least one record specified by the user via the graphical user interface; and displaying the data retrieved in the graphical user interface.

15. A data processing system comprising:

a processor;

a database;

an existing query statement residing in storage;

a query interface allowing users to issue query statements against the database; and a transaction manager which, when executed by the processor, is configured to generate a transactional statement against the database based on fields and corresponding field attributes of the existing query statement; wherein the transaction manager is configured to generate the transactional statement against the database by:

parsing the existing query statement to identify the fields and corresponding field attributes;

generating one or more interfaces for receiving input regarding the transactional statement; and generating the transactional statement based on the identified fields and user input.

16. The data processing system of claim 15, wherein the transaction manager is configured to attain, from the database, metadata for use in generating the transactional statement.

17. The data processing system of claim 15, further comprising one or more plug-in components allowing access to the one or more interfaces from the query interface.

18. The data processing system of claim 17, wherein the one or more plug-in components provide access to an interface for entering input to be used in an insert transactional statement.

19. The data processing system of claim 17, wherein the one or more plug-in components provide access to an interface for updating a record.

20. The data processing system of claim 19, wherein the one or more plug-in components provide access to an interface for updating multiple records.

21. The data processing system of claim 19, wherein the database is one of: a relational database, an object-relational database, an XML database, and a relational database.

* * * * *